United States Patent
Colignon

(10) Patent No.: US 7,584,606 B2
(45) Date of Patent: Sep. 8, 2009

(54) SYSTEM FOR ASSISTING THE REGENERATION OF DEPOLLUTION MEANS INTEGRATED IN AN EXHAUST LINE OF A VEHICLE DIESEL ENGINE

(75) Inventor: Christophe Colignon, Levallois Perret (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 8 days.

(21) Appl. No.: 10/595,624

(22) PCT Filed: Oct. 4, 2004

(86) PCT No.: PCT/FR2004/002502

§ 371 (c)(1),
(2), (4) Date: May 1, 2006

(87) PCT Pub. No.: WO2005/049994

PCT Pub. Date: Jun. 2, 2005

(65) Prior Publication Data
US 2007/0130916 A1 Jun. 14, 2007

(30) Foreign Application Priority Data
Nov. 7, 2003 (FR) ................................ 03 13156

(51) Int. Cl.
*F01N 3/00* (2006.01)
(52) U.S. Cl. .................. 60/295; 60/274; 60/277; 60/285; 60/297; 123/481; 123/198 F
(58) Field of Classification Search .................. 60/285, 60/286, 280, 295, 297, 303, 277; 44/358, 44/359, 363, 366; 123/481, 198 F
See application file for complete search history.

(56) References Cited

U.S. PATENT DOCUMENTS 4,655,037 A * 4/1987 Rao ............................. 60/274

(Continued)

FOREIGN PATENT DOCUMENTS

DE 19963930 A 7/2001

(Continued)

OTHER PUBLICATIONS

International Search Report dated Feb. 15, 2005.

(Continued)

*Primary Examiner*—Tu M Nguyen
(74) *Attorney, Agent, or Firm*—Nicolas E. Seckel

(57) ABSTRACT

System in which the depollution apparatus is associated with an oxidation catalyst-forming device, and the engine is associated with a common rail for feeding it with fuel and adapted to implement the strategy of regeneration using at least one postinjection of fuel into the cylinders. In the system, a regeneration request can be detected, a state in which the vehicle accelerator pedal is being raised can be detected, the temperature downstream from the catalyst-forming means can be acquired, and it can be determined, on the basis of this temperature, the maximum duration for applying postinjections during a stage in which the engine is returning to idling as a result of the accelerator pedal being raised, for immediately cutting off postinjection as soon as the duration of postinjection use has reached the maximum duration.

20 Claims, 1 Drawing Sheet

U.S. PATENT DOCUMENTS

| | | | |
|---|---|---|---|
| 6,510,685 B2 * | 1/2003 | Bolz et al. | 60/285 |
| 6,536,209 B2 | 3/2003 | Fluga et al. | |
| 6,574,956 B1 * | 6/2003 | Moraal et al. | 60/295 |
| 6,594,990 B2 * | 7/2003 | Kuenstler et al. | 60/295 |
| 6,598,387 B2 | 7/2003 | Carberry et al. | |
| 6,763,659 B2 * | 7/2004 | Watanabe et al. | 60/297 |
| 6,802,180 B2 | 10/2004 | Gabe et al. | |
| 6,829,886 B2 * | 12/2004 | Nakata | 60/277 |
| 6,931,842 B2 * | 8/2005 | Ohtake et al. | 60/295 |
| 6,951,100 B2 | 10/2005 | Kuboshima et al. | |
| 7,017,337 B2 * | 3/2006 | Plote et al. | 60/295 |
| 7,021,050 B2 * | 4/2006 | Nishimura et al. | 60/295 |
| 7,062,906 B2 | 6/2006 | Otake et al. | |
| 7,104,047 B2 * | 9/2006 | Takubo | 60/285 |
| 7,104,050 B2 | 9/2006 | Sato et al. | |
| 7,137,247 B2 | 11/2006 | Koga et al. | |
| 7,146,804 B2 * | 12/2006 | Yahata et al. | 60/295 |
| 7,159,391 B2 | 1/2007 | Kogo et al. | |
| 7,237,379 B2 * | 7/2007 | Nakano et al. | 60/295 |
| 2002/0007629 A1 * | 1/2002 | Asanuma et al. | 60/297 |
| 2005/0217251 A1 * | 10/2005 | Sato et al. | 60/295 |

FOREIGN PATENT DOCUMENTS

| | | |
|---|---|---|
| DE | 10007049 A | 8/2001 |
| EP | 1174612 A | 1/2002 |
| EP | 1176290 A | 1/2002 |
| EP | 1234959 A | 8/2002 |
| EP | 1281852 A | 2/2003 |
| FR | 2805568 A | 8/2001 |
| FR | 2831923 A | 5/2003 |
| WO | WO 200238933 A1 * | 5/2002 |

OTHER PUBLICATIONS

Patent Abstracts of Japan vol. 2002, No. 12, Dec. 12, 2002 & JP 2002235590 of Aug. 23, 2002.

International Search Report dated Mar. 1, 2005 in PCT/FR2004/002514 (U.S. Appl. No. 10/595,635).

International Search Report dated Feb. 15, 2005 in PCT/FR2004/002494 (U.S. Appl. No. 10/595,623).

* cited by examiner

SYSTEM FOR ASSISTING THE REGENERATION OF DEPOLLUTION MEANS INTEGRATED IN AN EXHAUST LINE OF A VEHICLE DIESEL ENGINE

BACKGROUND ART

The present invention relates to a system for assisting the regeneration of depollution means associated with oxidation catalyst-forming means and integrated in an exhaust line of a motor vehicle diesel engine.

More particularly, the invention relates to a system in which the engine is associated with a common manifold or "rail", for feeding fuel to the cylinders of the engine and adapted to implement, at constant torque, a regeneration strategy by injecting fuel into the cylinders in at least one postinjection operation.

During regeneration of depollution means such as a particle filter, for example, stages in which the vehicle accelerator pedal is being raised (no fuel injection in normal operation), and stages in which the engine is idling (very low exhaust temperature), a problematic since, they cause the exhaust temperature to drop, i.e. the temperature of the exhaust line and of elements integrated therein.

The use of one or more postinjections during these stages in the lifetime of the engine serves to limit the temperature drop in the exhaust line, by relying on the catalytic conversion of the HCs produced by combustion of the or each postinjection in the engine.

However, such strategies rely on an exothermic reaction being produced by the catalyst-forming means, which means, e.g. comprising an oxidation catalyst for a NOx trap with a CO/HC oxidation function, are assumed to be active.

During stages in which the engine is returning to idling, as a result of the accelerator pedal being raised, there is no main injection nor any pilot injection, and as a result, the or each postinjection does not burn in the cylinder, which does no more than vaporize the fuel in the form of HCs that are subsequently converted by the catalyst-forming means.

The temperature at the inlet to the oxidation catalyst-forming means is thus very low, and in spite of the exothermic reaction produced by the catalytic combustion of the HCs coming from the or each postinjection, the front face of the catalyst-forming means cools down progressively and its conversion activity becomes progressively deactivated.

During a prolonged stage of returning to idling, it can happen then the catalyst-forming means are therefore not sufficiently active to convert all of the HCs, which leads to HC peaks downstream front the catalyst-forming means, or even the blue smoke and/or exhaust odors.

Furthermore, the use of postinjections leads to the lubricating oil being diluted by fuel, thereby degrading its lubrication properties, and in particular lowering its viscosity, and if the viscosity becomes too low, that can lead to damage to the engine.

SUMMARY OF THE INVENTION

The object of the invention is thus to solve these problems.

To this end, the invention provides a system for assisting the regeneration of depollution means associated with oxidation catalyst-forming means, and integrated in an exhaust line of a motor vehicle diesel engine, and in which the engine is associated with common rail means for feeding fuel to the cylinders of the engine and adapted, at constant torque, to implement a strategy of regeneration by injecting fuel into the cylinders in at least one postinjection, the system being characterized in that it comprises:

- detector means for detecting a request for regeneration and thus for postinjection;
- detector means for detecting that the vehicle accelerator pedal is being raised;
- acquisition means for acquiring the temperature downstream from the catalyst-forming means;
- determination means for determining, on the basis of said temperature, a maximum duration for applying postinjections during a stage in which the engine is returning to idling as a result of the accelerator pedal being raised; and
- cutoff means for immediately cutting off the or each postinjection as soon as the duration of postinjection use has reached the predetermined maximum duration of application.

According to other characteristics:
- the depollution means comprise a particle filter;
- the depollution means comprise a NOx trap;
- the fuel includes an additive for becoming deposited together with the particles with which it is mixed own the depollution means in order to facilitate regeneration thereof;
- the fuel includes an additive forming a NOx trap; and
- the engine is associated with a turbocharger.

BRIEF DESCRIPTION OF THE DRAWINGS

The invention can be better understood on reading the following description given purely by way of example and made with reference to the accompanying drawing, in which.

DETAILED DESCRIPTION OF PARTICULAR EMBODIMENTS

Figure 1:
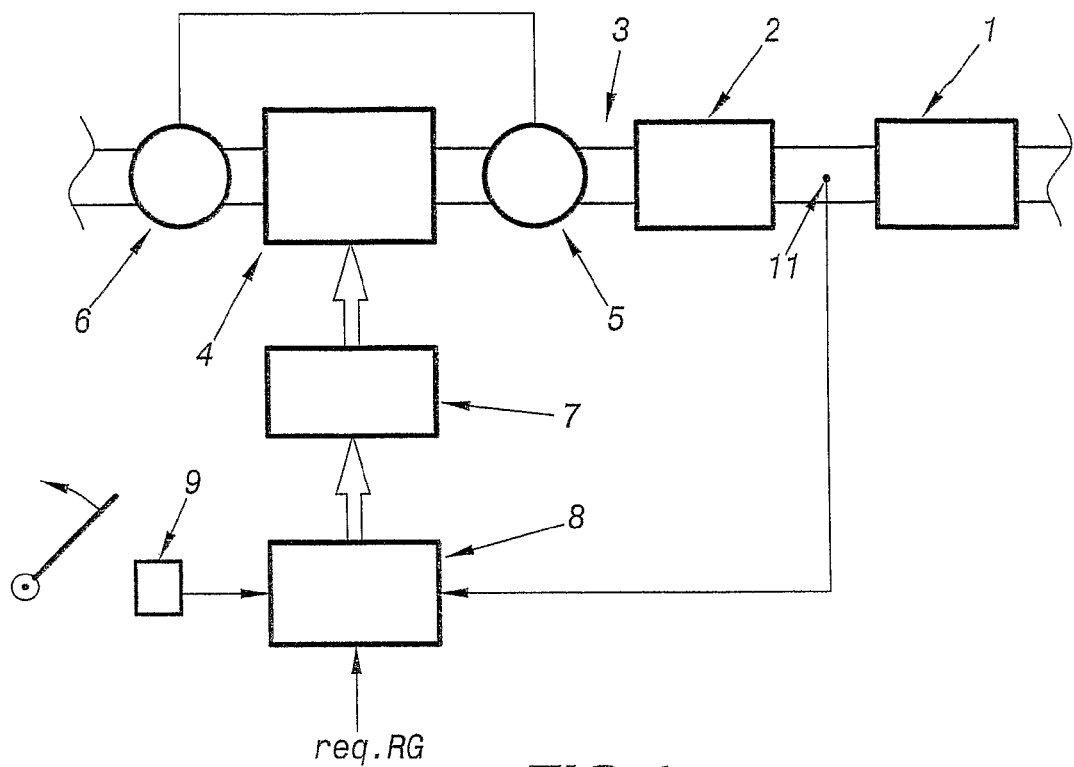
FIG. 1 is a block diagram showing the general structure of a system of the invention for assisting regeneration.

FIG. 1 shows the general structure of the system for assisting in the regeneration of depollution means, given overall reference 1 in this figure, associated with means forming an oxidation catalyst, given overall reference 2, and integrated in an exhaust line 3 of a motor vehicle diesel engine 4.

The engine may be associated with a turbocharger, and in this case the turbine portion 5 thereof is also associated with the exhaust line, the compressor portion 6 of the turbocharger being placed upstream of the engine.

The engine is also associated with common manifold or "rail" means 7 for feeding fuel to the cylinders of the engine, and adapted, at constant torque, to implement a regeneration strategy by injecting fuel into the cylinders, in at least one postinjection operation, in conventional manner.

These means are controlled by a control unit, given overall reference 8, that is adapted to detect a request req.RG for regeneration and thus for postinjection, e.g. as delivered by the supervisor of the depollution means, and the control unit 8 is also connected to means 9 for detecting a state in which the vehicle accelerator pedal is being raised.

These means may present any suitable structure.

The control unit 8 is also connected to means for acquiring the temperature downstream from the catalyst-forming means 2, these temperature acquisition means being given overall reference 11.

These means comprise any suitable temperature sensor.

Figure 2:
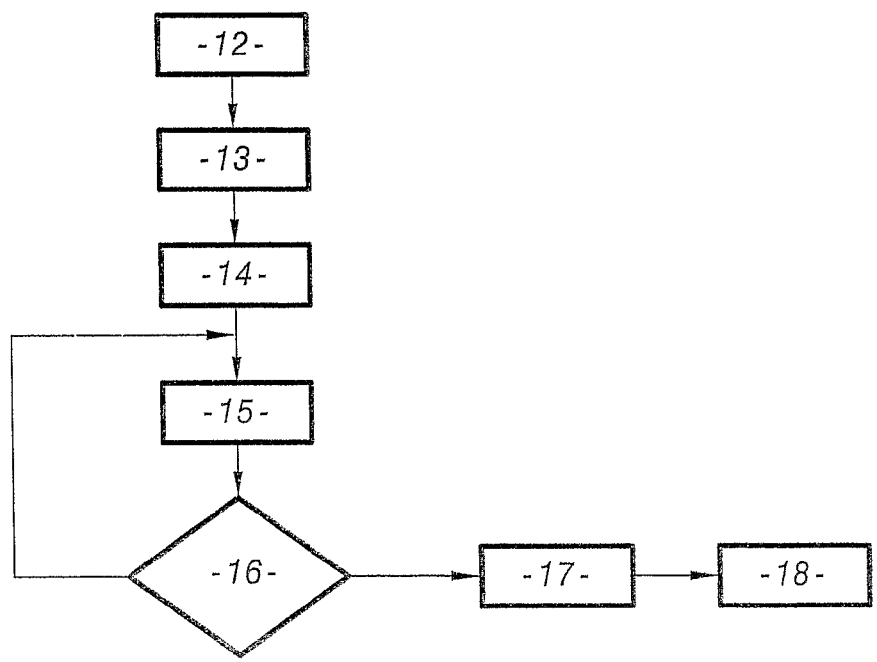
FIG. 2 is a flow chart showing the operation thereof.

This then makes it possible for the control unit 8, after detecting a request for regeneration and thus for postinjection, to detect a state in which the vehicle accelerator pedal is being raised, as shown by step 12 in FIG. 2.

The unit 8 is then adapted to acquire the temperature downstream from the catalyst-forming means during a step 13 and to determine a maximum duration for applying postinjections while at the engine is returning to idling as a result of the accelerator pedal being raised, on the basis of the said temperature during a step 14.

In steps 15 and 16, the unit 8 then monitors the duration of postinjection use and detects the moment when said duration of use reaches the predetermined maximum duration of application.

As soon as the duration of use has reached the predetermined maximum duration of application during a stage in which the engine is returning to idling as a result of the accelerator pedal being raised, as shown by step 17, the pilot unit 8 is adapted to interrupt immediately the or each postinjection, as illustrated by step 18.

It should also be observed that such a system can operate with depollution means formed by a particle filter, or a NOx trap, and that it is also possible, in conventional manner, to mix an additive with the fuel for the purpose of depositing the additive together with the particles with which it is mixed on the depollution means in order to facilitate regeneration thereof by lowering the combustion temperature of soot trapped therein.

In conventional manner, the additive remains present in the particles after the fuel containing the additive has burnt in the engine.

It is also possible to envisage using an additive forming a NOx trap.

It can thus be understood that by means of such a structure, a maximum duration is allowed for applying postinjections during a stage in which the accelerator pedal is being raised.

This maximum duration is presented in the form of a timer which empties, i.e. which counts down or decrements during the stage in which the accelerator pedal is being raised in a stage while regeneration is taking place. The counter is reinitialized at the end of this stage.

This system serves the limit of the quantities of fuel there are postinjected while the accelerator pedal is being raised when the temperature levels in the exhaust line are the least favorable.

By limiting in this manner the total quantity of fuel that is postinjected during this stage, which is not the most effective from the point of view of regenerating the depollution means, the proportion of postinjection time that is effective is optimized and the extent to which the lubricating oil of the engine is diluted by the fuel is limited.

Finally, this also serves to limit the risk of the oxidation function becoming suddenly deactivated, which would lead to a deficit in the conversion of HCs, and thus to a puff of HCs in the exhaust that could lead to smoke and/or odors.

Naturally, other embodiments could be envisaged.

Thus, for example, the depollution means and the oxidation catalyst-forming means could be integrated in a single element, and in particular on a common substrate.

By way of example, a particle filter integrating the oxidation function could be envisaged.

Similarly, a NOx trap integrating such an oxidation function could also be envisaged, whether using an additive or not.

This oxidation and/or NOx trap function could be performed for example by an additive mixed with the fuel.

The invention claimed is:

1. A method of assisting the regeneration of a depollution device associated with an oxidation catalyst, and integrated in an exhaust line of a motor vehicle diesel engine, and in which the engine is associated with a common rail for feeding fuel to the cylinders of the engine and adapted, at constant torque, to implement a strategy of regeneration by injecting fuel into the cylinders in at least one postinjection, the method comprising:
   detecting a request for regeneration and thus for postinjection;
   detecting that the vehicle accelerator pedal is being raised;
   acquiring the temperature downstream from the oxidation catalyst;
   determining, on the basis of said temperature, a maximum duration for applying postinjections during a stage in which the main injections are stopped and the engine is returning to idling as a result of the accelerator pedal being raised; and
   immediately cutting off the postinjections as soon as the duration of postinjection use has reached the predetermined maximum duration of application during this stage in which the main injections are stopped and the engine is returning to idling as a result of the accelerator pedal being raised, so as to limit the quantities of fuel that are postinjected when temperature levels in the exhaust line are unfavorably low.

2. A method according to claim 1, wherein the fuel includes an additive for becoming deposited together with the particles with which it is mixed on the depollution device in order to facilitate regeneration thereof.

3. A method according to claim 1, wherein the fuel includes an additive forming a NOx trap.

4. A method according to claim 1, wherein the engine is associated with a turbocharger.

5. A method according to claim 1, wherein the depollution device comprises a NOx trap.

6. A method according to claim 5, wherein the fuel includes an additive for becoming deposited together with the particles with which it is mixed on the depollution device in order to facilitate regeneration thereof.

7. A method according to claim 1, wherein the depollution device comprises a particle filter.

8. A method according to claim 7, wherein the fuel includes an additive for becoming deposited together with the particles with which it is mixed on the depollution device in order to facilitate regeneration thereof.

9. A method according to claim 7, wherein the depollution device comprises a NOx trap.

10. A method according to claim 9, wherein the fuel includes an additive for becoming deposited together with the particles with which it is mixed on the depollution device in order to facilitate regeneration thereof.

11. A system for assisting the regeneration of depollution means associated with oxidation catalyst-forming means, and integrated in an exhaust line of a motor vehicle diesel engine, and in which the engine is associated with common rail means for feeding fuel to the cylinders of the engine and adapted, at constant torque, to implement a strategy of regeneration by injecting fuel into the cylinders in at least one postinjection, the system comprising:
   detector means for detecting a request for regeneration and thus for postinjection;
   detector means for detecting that the vehicle accelerator pedal is being raised;
   acquisition means for acquiring the temperature downstream from the catalyst-forming means;

determination means for determining, on the basis of said temperature, a maximum duration for applying postinjections during a stage in which the main injections are stopped and the engine is returning to idling as a result of the accelerator pedal being raised; and cutoff means for immediately cutting off the postinjections as soon as the duration of postinjection use has reached the predetermined maximum duration of application during the stage in which the main injections are stopped and the engine is returning to idling as a result of the accelerator pedal being raised, so as to limit the quantities of fuel that are postinjected when temperature levels in the exhaust line are unfavorably low.

12. A system according to claim 11, wherein the fuel includes an additive for becoming deposited together with the particles with which it is mixed on the depollution means in order to facilitate regeneration thereof.

13. A system according to claim 11, wherein the fuel includes a additive forming a NOx trap.

14. A system according to claim 11, wherein the engine is associated with a turbocharger.

15. A system according to claim 11, wherein the depollution means comprises a NOx trap.

16. A system according to claim 15, wherein the fuel includes an additive for becoming deposited together with the particles with which it is mixed on the depollution means in order to facilitate regeneration thereof.

17. A system according to claim 11, wherein the depollution means comprises a particle filter.

18. A system according to claim 17, wherein the fuel includes an additive for becoming deposited together with the particles with which it is mixed on the depollution means in order to facilitate regeneration thereof.

19. A system according to claim 17, wherein the depollution means comprises a NOx trap.

20. A system according to claim 19, wherein the fuel includes an additive for becoming deposited together with the particles with which it is mixed on the depollution means in order to facilitate regeneration thereof.

* * * * *